Sept. 13, 1966  H. LINDE  3,272,316
REFUSE COLLECTING CONTAINER WITH A FEED SCREW
Filed Dec. 26, 1963
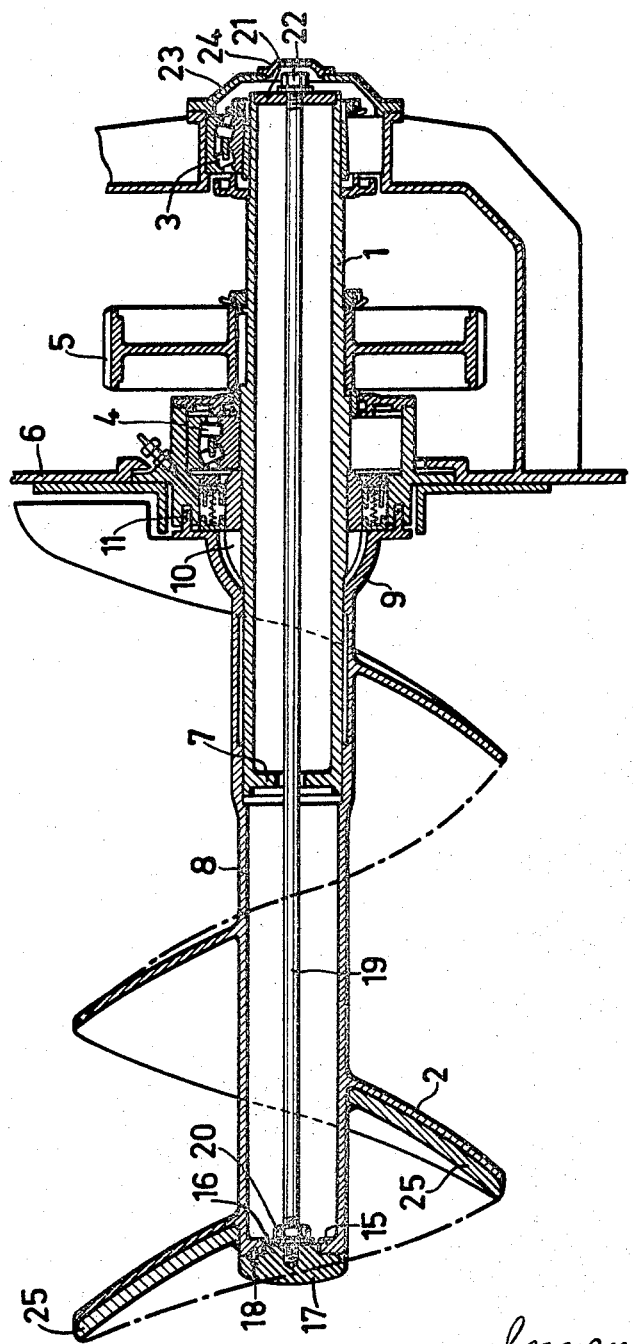
Inventor
Hilding Linde
by Sommers & Young
Attorneys 3,272,316
REFUSE COLLECTING CONTAINER WITH A
FEED SCREW
Hilding Linde, Kalmar, Sweden, assignor to Norba
Aktiebolag, Blomstermala, Sweden
Filed Dec. 26, 1963, Ser. No. 333,506
The portion of the term of the patent subsequent to
March 31, 1981, has been disclaimed
1 Claim. (Cl. 198—213)

The invention relates generally to refuse collecting containers of the type provided on a motor vehicle and particularly to feed screws passing through the wall of such collecting containers.

By means of such a feed or conveyor screw the refuse fed into the collecting container may be compressed to a considerably reduced volume, whereby the load space may be better utilized. The screw, however, is thereby subjected to a considerable wear and is, therefore, often to be replaced. The parts of the feed screw especially subjected to wear consist of the fore ends of the spindle and its screw blade or screw flights.

The principal object of the invention is to reduce this wear as far as possible and to make the feed screw in such a way that those parts of the screw proper which are subjected to the greatest wear may be easily replaced when necessary.

With this and other objects in view the feed screw of the refuse collecting container according to the invention is composed of a separate hollow driving shaft and a screw with a tubular spindle detachably mounted on said hollow driving shaft within said collecting container. The feed screw has a screw blade spirally encircling the outer circumferential surface of the tubular spindle and rigidly secured thereto. At least the inner portion of this screw blade is covered by a protecting layer of a material more wear-resistant than that of the tubular spindle proper. A cap which also consists of a material substantially more wear-resistant than that of the tubular spindle and has a convex, smooth inner end surface sealingly and non-rotatably abuts against the inner end of the tubular spindle and is provided with a threaded hole extending less than completely through the cap and opening outwards. These threads are in engagement with the threaded inner end of a clamping bolt which passes through the hollow driving shaft and the tubular spindle and is associated with fastening means for pressing the tubular spindle onto said driving shaft and for detachably interconnecting them.

Further objects and advantages of the invention will become more fully apparent from the following description and the accompanying drawing illustrating one preferred embodiment of the invention, and in which the single figure is a longitudinal section of a feed screw according to one form of the invention.

Referring to the drawing a tubular driving shaft 1 for the screw, comprising a tubular spindle 8, and a screw blade 2, is freely supported at its rear end in two roller bearings 3, 4 between which the gear box (not shown) is provided for driving the shaft 1 by means of a gear wheel 5. The screw-blade 2 has an arcuate contour as seen in a longitudinal section along the axis of said tubular spindle and a concave surface facing the inner end of said tubular spindle. The gear box may be secured to the wall 6 of the refuse collecting container, and the driving shaft 1 extends the relative short distance through said wall and is at its fore end provided with a transverse end wall 7.

The outer or rear portion of the tubular spindle 8 of the screw encases the shaft 1 and forms an enlargement 9 provided on its inside with claws intermeshing with similar claws 10 on the driving shaft 1 so as to form a claw coupling.

The rear portion of the enlargement 9 forms a labyrinth seal 11, and further sealing means may also be provided if desired.

The spindle 8 has its force end provided with a radially inturned flange 15, and a sealing cap 17 for the spindle 8 with the same diameter as the spindle has a central portion 16 introduced into the opening encircled by said flange 15. This cap is subjected to heavy wear from the compressed refuse, and is therefore made of a more wear-resistant material than the screw proper, such as glass-hard manganese steel. For locking the cap 17 against rotation with respect to the spindle 8 it is provided with a pin 18 engaging a corresponding hole in the flange 15. The fore end of a clamping bolt 19 is threaded into a bore extending only partly through the cap 17 and is locked by means of a nut 20. The cap 17 has a continuous outer surface and it has also a sufficient thickness to allow a considerable wear before the bolt 19 and the pin 18 are exposed. The clamp bolt passes freely through the wall 7 and continues through a threaded hole in the plate 21 provided in a turned recess in the rear end of the driving shaft, and by means of a nut 22 the clamping bolt may be pressed against the plate. The rear bearing 3 is closed by means of a cap 23 with a removable cover 24 and after removal of this cover the nut 22 is made accessible.

For protection of the screw blade 2 the fore end thereof is lined with a protecting cover 25 of a wear resistant material, such as manganese steel which at points along the periphery of the blade is secured by welding in such a way that it may be easily replaced. This protecting cover 25 may preferably extend less than 360°, such as about 300°, and has the same form as the blade with its inner diameter substantially equal to the outer diameter of the spindle 8.

While the invention has been particularly shown and described with refernce to one preferred embodiment thereof, it will be understood by those skilled in the art that various changes in form and details may be made therein without departing from the spirit and scope of the invention.

What I claim is:

A rotary conveyor screw for forcing refuse into a collecting container, comprising a wall constituting part of said container; a driving means; a hollow driving shaft drivingly coupled to said driving means and extending through said wall partly into said refuse collecting container; a tubular spindle arranged coaxially with respect to said driving shaft in said refuse collecting container, the outer end of said tubular spindle encasing the inner end of said driving shaft; a screw blade, spirally encircling the outer circumferential surface of said tubular spindle and rigidly secured thereto; a cap which has a smooth, convex inner end surface and sealingly and non-rotatably abuts against the inner end of said tubular spindle and is provided with a threaded hole extending less than completely through said cap and opening outwards, said sealing cap consisting of a material substantially more wear-resistant than that of said tubular spindle; a clamping bolt passing through said hollow driving shaft and said tubular spindle; threads upon the inner end of said clamping bolt in engagement with the threads of said sealing cap; fastening means associated with the outer ends of said hollow driving shaft and said clamping bolt for pressing said tubular spindle onto said driving shaft and for detachably interconnecting them; and a protecting cover of a material more wear-resistant than that of said tubular spindle covering at least the inner portion of said screw blade.

References Cited by the Examiner

UNITED STATES PATENTS 3,127,008  3/1964  Linde _____ 198—213

EVON C. BLUNK, *Primary Examiner.*

RICHARD E. AEGERTER, SAMUEL F. COLEMAN,
*Examiners.*